W. ALLEN.
HAY LOADER.
APPLICATION FILED FEB. 8, 1912.
1,042,748.
Patented Oct. 29, 1912.
3 SHEETS—SHEET 1.
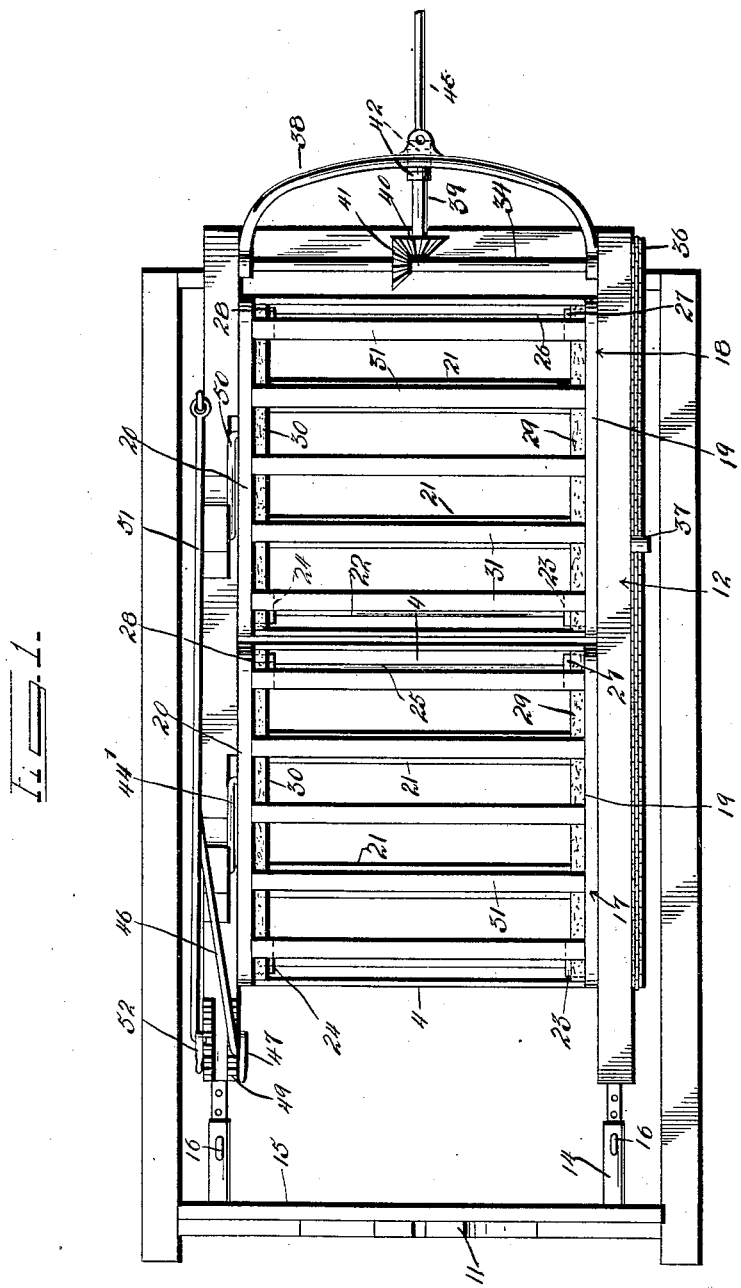
Witnesses
Inventor
W. Allen.
By
Attorneys

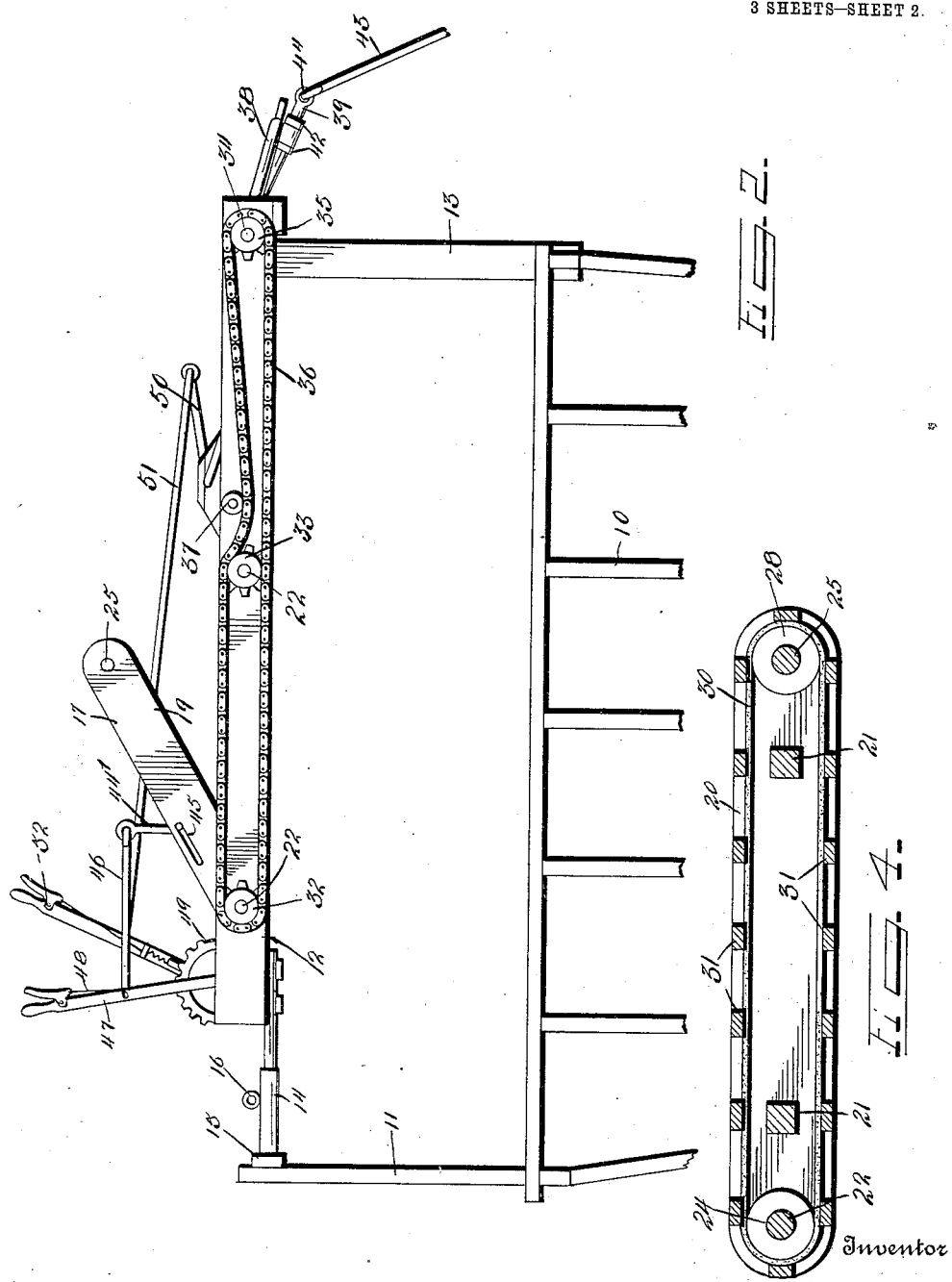

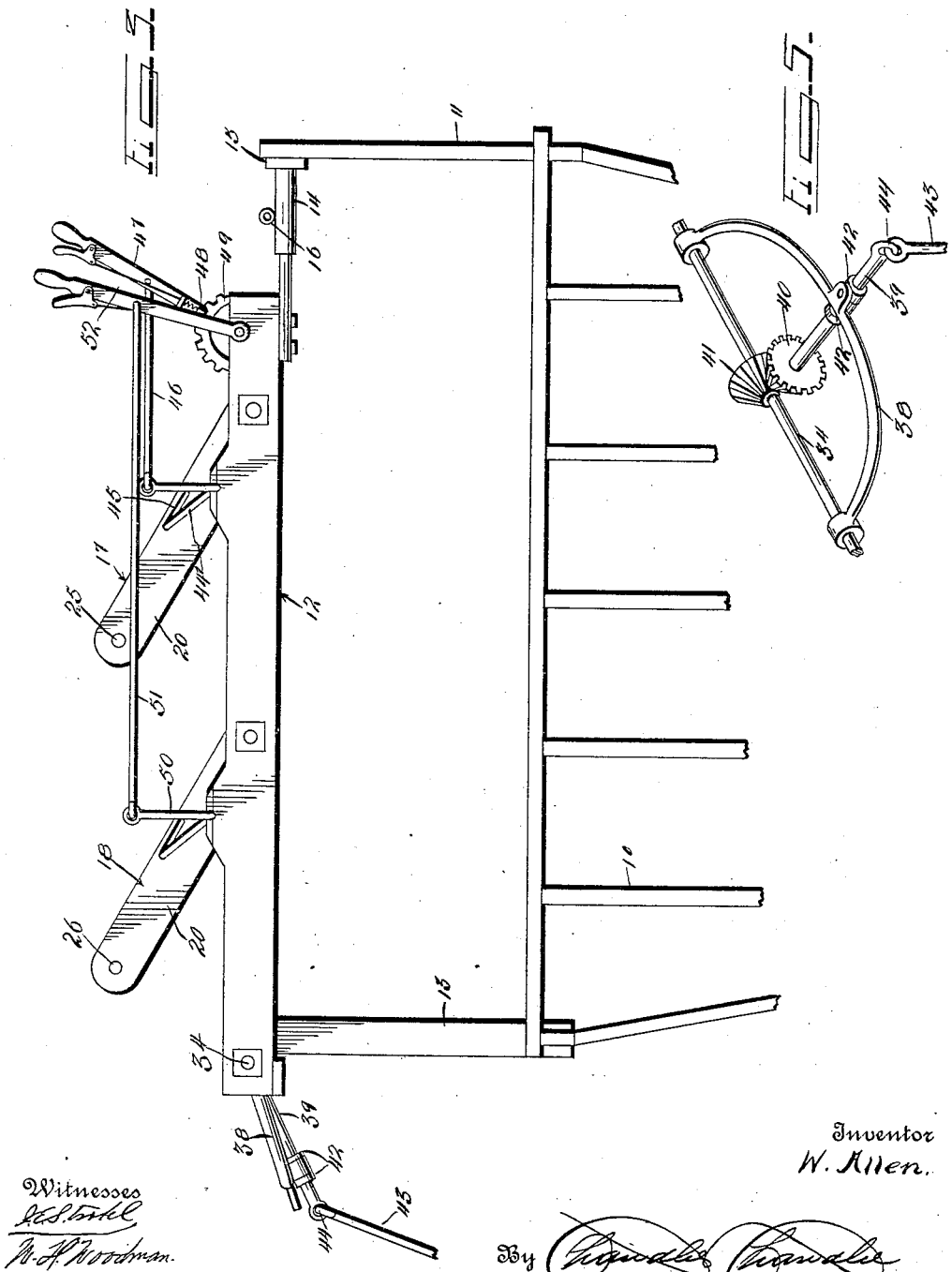

UNITED STATES PATENT OFFICE.

WILLIAM ALLEN, OF BURLINGTON JUNCTION, MISSOURI.

HAY-LOADER.

1,042,748. Specification of Letters Patent. Patented Oct. 29, 1912.

Application filed February 8, 1912. Serial No. 676,330.

*To all whom it may concern:*

Be it known that I, WILLIAM ALLEN, a citizen of the United States, residing at Burlington Junction, in the county of Nodaway, State of Missouri, have invented certain new and useful Improvements in Hay-Loaders; and I do hereby declare the following to be a full, clear, and exact description of the invention, such as will enable others skilled in the art to which it appertains to make and use the same.

My invention relates to new and useful improvements in hay loading machines, and more especially to an attachment for said machines for causing an even distribution of the hay to all parts of the rack as it is being loaded and the object of my invention is to improve the construction and increase the efficiency of machines of the above described type.

A further object of my invention is the provision of a machine for distributing hay upon a rack, whereby the hay may be at any time supplied to any portion of the rack desired. And a still further object of my invention is to provide a machine of the above described type which will be actuated by the customary form of hay loader which will also supply the hay to my distributer.

With these objects in view, my invention consists primarily of a frame adapted to be secured in spaced relation above the rack and to extend throughout the length of the same, a plurality of endless belt carrier members mounted in said frame, means for actuating said carriers to convey the hay, and means for moving any one or all of said carriers into inoperative position.

In the accompanying drawings which illustrate a preferred embodiment of my machine and in which like reference numerals designate corresponding parts throughout, Figure 1 is a top plan of my machine showing the same applied to a conventional form of rack and positioned to load the hay at the forward end thereof. Fig. 2 is a front elevation of the same showing the parts in position to supply the hay to the middle of the rack. Fig. 3 is a rear elevation showing the parts in position to supply hay to the rear of the rack. Fig. 4 is a section on the line 4—4 of Fig. 1, showing the construction of one of the conveyer members. Fig. 5 is a detail perspective of the connection between the operating mechanism of my machine and a drive shaft from the hay loader proper.

Referring more specifically to the drawings, 10 designates in general a hay rack of the customary or any preferred construction provided at its forward end with the usual binding staff 11 and my improved machine, which, as a whole, is designated by the numeral 12 is positioned over the rack as shown, its forward end being secured to the binding staff 11 and its rearward end being supported by means of downwardly extending rods 13, the lower ends of which are bifurcated to form forked arms adapted for engagement over the sides of the rack.

The frame of the machine is substantially rectangular in shape and may be formed either of wood or metal as preferred and this rectangular frame has its sides extended forwardly and telescopically within the side members 14 carried by the cross bar 15 by which the frame is secured to the staff. These extended ends of the sides are adjustably secured within the members 14 by means of pins 16 which are passed through apertures formed in the members 14 and which engage in one of a series of apertures formed in each of the members of the frame. By this means the frame may be extended over the entire length of the rack, thus adapting the machine for employment on racks of various sizes.

Mounted between the sides of the frame are a plurality of conveyer members, the number of said members depending upon the length of the rack with which the machine is to be employed. Under ordinary circumstances but two of these members are necessary, these being positioned as shown at 17 and 18 one adjacent the rear of the machine and the other immediately in advance of the first. Each of these members consists of spaced side members 19 and 20 secured together by transverse members 21 and are mounted in the frame by means of shafts 22 which are journaled in suitable bearings carried by the side members of the frame of the machine and which are passed through suitable bores formed in the forward end of the side members of the conveyer frames, said frames being preferably constructed of metal.

Each of the shafts 22 is provided with pulleys 23 and 24 positioned one adjacent either side of the conveyer frame. The rear ends of each of the side members of the conveyer frames are provided with suitable journals in which are rotatably mounted a second pair of shafts 25 and 26 also provided with pulleys 27 and 28 which pulleys, are in alinement with the pulleys 23 and 24 carried by the first mentioned shafts. Coacting with the pulleys 23 and 27 is a belt 29 and coacting with the pulleys 24 and 28 is a belt 30 and these belts are connected by a plurality of transversely extending, spaced apart strips or slats 31 in such a manner that the belts together with the slats form an endless conveyer for receiving the hay as it comes from the loader.

One end of each of the shafts 22 is extended beyond the side of the main frame and keyed upon said extended ends are sprocket wheels 32 and 33 by means of which the conveyers may be actuated. Journaled in the rear ends of the side members of the main frame is a shaft 34 one end of which extends beyond the frame and is provided with a sprocket wheel 35 and a sprocket chain 36 coacts with the sprocket wheels 32 and 33 and with the sprocket wheel 35 in such a manner that the rotation of the latter will cause a corresponding rotation of the former. In order to maintain the sprocket chain in engagement with the intermediate sprocket wheel 33 I have provided an idler 37 which is carried by the side of the frame and which bears against the chain, tensioning the same.

A yoke 38 is swingingly mounted upon the shaft 34 and journaled through the central portion of this yoke is a shaft 39 provided at its forward end with a bevel gear 40 which meshes with a bevel gear 41 carried by the shaft 34, said shaft 39 being held against longitudinal movement in its bearing by means of collars 42. A drive shaft 43 is connected by one end to the free end of the shaft 39 by means of a gimbal joint 44 and the other end of the shaft 43 is operatively connected to the operating mechanism of the loader which, as the loader itself forms no part of the present invention, is not shown.

As a means for moving the carrier 17 into and out of operative position I have provided a bell crank lever 44' which is suitably mounted upon one of the side members of the frame and one arm of which terminates in a lateral extension adapted to engage in a slot 45 formed in one side of the frame of the conveyer member 17 while the other arm is operatively connected by means of a link 46 to a hand lever 47 which is swingingly mounted upon the frame and provided with a spring pressed pawl 48 adapted for engagement with a sector rack 49 by means of which the conveyer may be held in any desired position. The conveyer 18 is provided in like manner with a bell crank lever 50 which is operatively connected by the link 51 with a second hand lever 52 similar in construction to the hand lever 47.

In operation the machine is attached to the rack in the manner shown and with the conveyer members in lowered position. The hay loader proper is then put in action to pass the hay up to the rear conveyer member and the shaft 43 being driven by the hay loader causes the conveyer belt to carry the hay forwardly, the hay passing from the rear conveyer to the forward one and from there to the front of the rack. When the forward end of the rack has been filled the lever 47 is actuated to raise the forward conveyer to inoperative position as shown in Fig. 2, when the hay is delivered to the central portion of the rack directly from the rear conveyer. After the central portion of the rack has been filled in this manner the lever 52 is actuated to swing the rear conveyer 18 into inoperative position when the hay is delivered directly from the loader proper to the rear portion of the rack.

In actual practice the operating mechanism comprising the bevel gears 40 and 41 will be provided with a shield to prevent the hay clogging the mechanism. In the drawings however this shield has been omitted to better show the positioning of the parts.

It will thus be seen that I have provided an effective machine for distributing of hay to the various parts of the rack as it comes from the loader and it will also be seen that the machine is simple both in construction and operation.

What I claim is:—

1. A machine of the character described, comprising an expansible frame adapted to be positioned over a hay rack, a plurality of conveyers carried by said frame in position to receive the hay as it comes from the loader, means for actuating said conveyers to pass the hay forwardly, and means for raising said conveyers into inoperative position.

2. A machine of the class described, comprising an expansible frame adapted to be detachably secured to a hay rack, a plurality of shafts journaled in said frame, a conveyer member carried by each of said shafts and having a conveyer belt adapted to be actuated by the rotation of said shafts, sprocket wheels carried by said shafts, an additional shaft journaled in said frame, a sprocket wheel carried by said additional shaft, a sprocket chain coacting with the sprockets of the first mentioned shafts and with the sprocket of the additional shaft, means for actuating said additional shaft, and means for swinging said conveyers out of operative position.

3. A machine of the character described, comprising an expansible frame adapted for attachment to a hay rack a plurality of conveyer members mounted in said frame, a shaft journaled in said frame and provided with a bevel gear, a yoke swingingly mounted on said shaft, a second shaft journaled in said yoke and provided with a bevel gear meshing with the bevel gear of the first shaft, and means for swinging said conveyers out of operative position.

4. A machine of the character described, comprising a frame adapted for attachment to a hay rack, a plurality of conveyers carried by said frame, means for actuating said conveyers and means for swinging said conveyers into inoperative position, said means consisting of bell crank levers carried by the frame, one arm of each of said levers engaging in a slot formed in one of the conveyers, the other arms of said levers being operatively connected to hand levers.

In testimony whereof, I affix my signature, in presence of two witnesses.

WILLIAM ALLEN.

Witnesses:
T. A. CORKEN,
J. H. BARBER.

Copies of this patent may be obtained for five cents each, by addressing the "Commissioner of Patents, Washington, D. C."